(12) United States Patent
Thiruvenkatachari et al.

(10) Patent No.: US 9,888,413 B2
(45) Date of Patent: Feb. 6, 2018

(54) RESELECTION RESTRICTIONS FOR IMPROVING IDLE MODE MULTIMEDIA BROADCAST MULTICAST SERVICES SERVICE CONTINUITY

(71) Applicant: Samsung Electronics Co., Ltd., Gyeonggi-do (KR)

(72) Inventors: Balaji Srinivasan Thiruvenkatachari, Bangalore (IN); Swapnil Vinod Khachane, Bangalore (IN); Ashish Kumar Gupta, Bangalore (IN)

(73) Assignee: Samsung Electronics Co., Ltd (KR)

(*) Notice: Subject to any disclaimer, the term of this patent is extended or adjusted under 35 U.S.C. 154(b) by 294 days.

(21) Appl. No.: 14/671,412

(22) Filed: Mar. 27, 2015

(65) Prior Publication Data

US 2016/0080990 A1 Mar. 17, 2016

(30) Foreign Application Priority Data

Sep. 11, 2014 (IN) .......................... 4448/CHE/2014

(51) Int. Cl.
*H04W 36/00* (2009.01)
*H04L 29/06* (2006.01)
*H04W 76/00* (2009.01)
*H04W 48/02* (2009.01)
*H04W 48/20* (2009.01)

(52) U.S. Cl.
CPC ..... *H04W 36/0083* (2013.01); *H04L 65/4076* (2013.01); *H04W 76/002* (2013.01); *H04W 36/0061* (2013.01); *H04W 48/02* (2013.01); *H04W 48/20* (2013.01)

(58) Field of Classification Search
CPC .......... H04L 65/0476; H04W 36/0033; H04W 75/002
See application file for complete search history.

(56) References Cited

U.S. PATENT DOCUMENTS

2013/0095838 A1   4/2013 Uemura et al.
2013/0301509 A1*  11/2013 Purnadi .............. H04L 65/4076
                                                       370/312
2016/0381517 A1*  12/2016 Kim ....................... H04W 4/06
                                                       370/331

FOREIGN PATENT DOCUMENTS

WO   WO 2013/131306      9/2013

* cited by examiner

*Primary Examiner* — Luat Phung
(74) *Attorney, Agent, or Firm* — The Farrell Law Firm, P.C.

(57) ABSTRACT

A method for providing IDLE mode multimedia broadcast multicast service (MBMS) continuity in a telecommunication network is provided. The method includes providing an MBMS of interest for a user equipment (UE) from a first cell in the telecommunication network, using an MBMS gateway, performing a cell re-selection measurement of at least a second cell using the UE, the second cell being a neighboring cell to the first cell, wherein the cell re-selection measurement comprises determining a configuration of the second cell to facilitate an MBMS and determining a signal strength matching a predetermined strength value, and selecting one of the first cell and the second cell using the UE, which is configured to facilitate the MBMS and has a signal strength value at least equal to the predetermined strength value and greater than the other cell.

14 Claims, 5 Drawing Sheets

RESELECTION RESTRICTIONS FOR IMPROVING IDLE MODE MULTIMEDIA BROADCAST MULTICAST SERVICES SERVICE CONTINUITY

PRIORITY

This application claims priority under 35 U.S.C. § 119(a) to Indian Patent Application Serial No. 4448/CHE/2014, which was filed in the Indian Intellectual Property Office on Sep. 11, 2014, the entire disclosure of which is incorporated herein by reference.

BACKGROUND

1. Field of the Disclosure

The present disclosure relates generally to the field of telecommunication networks, and more particularly, to service-based prioritization of cells for improving IDLE mode multimedia broadcast multicast services (MBMS) service continuity in telecommunication networks.

2. Description of the Related Art

MBMS is a point-multi point specification for 3GPP cellular networks, which is designed to provide efficient delivery of broadcast and multicast services, both within a cell as well as within the core network. MBMS relies on Single Frequency Network configurations for the purpose of broadcast transmissions, wherein multiple cells, which are time synchronized, transmit the same contents over the same channel.

In the case of heterogeneous networks where a macro-pico structure is used, certain cells under any frequency layer are not configured to provide MBMS services. The network provides a user equipment (UE) connected to the network with information of the MBMS frequencies, the services provided by the frequencies (MBMS capabilities) using broadcast information and so on. Upon receiving this information, the UE prioritizes the frequency that provides the service(s) of interest to the user as the frequency of interest. This frequency of interest shall be used by the UE as the highest priority frequency in IDLE mode for a cell reselection procedure. However, not all cells under the frequency are configured to provide the service(s) of interest to the user. The existing prioritization techniques perform prioritization at the frequency level, and not at the cell level. As a result the UE is unaware of services being offered by each cell under the frequency layer being considered until the UE reselects the cell and reads the broadcast information.

As a result, the UE might end up in cells of the frequency of interest, which do not provide the service(s) the UE intends to receive. Further, the existing reselection rules do not offer any means for the UE to switch to another cell that provides the interested service. As a result, the UE will not be able to access the service, which, in turn, affects the user experience.

SUMMARY

The present disclosure has been designed to address at least the problems and/or disadvantages described above and to provide at least the advantages described below.

According to an aspect of the present disclosure, a method for providing IDLE mode MBMS continuity in a telecommunication network is provided. The method includes providing an MBMS of interest for a UE from a first cell in the telecommunication network, using an MBMS gateway, performing a cell re-selection measurement of at least a second cell using the UE, the second cell being a neighboring cell to the first cell, wherein the cell re-selection measurement comprises determining a configuration of the second cell to facilitate an MBMS and determining a signal strength matching a predetermined strength value, and selecting one of the first cell and the second cell using the UE, which is at least configured to facilitate the MBMS and has a signal strength value at least equal to the predetermined strength value and greater than the other cell.

According to another aspect of the present disclosure, system for providing IDLE mode MBMS service continuity in a telecommunication network is provided. The system is configured to provide an MBMS of interest for a UE from a first cell in the telecommunication network, using the UE, perform a cell re-selection measurement of at least a second cell using the UE, the second cell being a neighboring cell to the first cell, wherein the cell re-selection measurement includes determining a configuration of the second cell to facilitate an MBMS and determining a signal strength matching a predetermined strength value, and select one of the first cell and the second cell using the UE, which is at least configured to facilitate the MBMS and has a signal strength value at least equal to the predetermined strength value.

BRIEF DESCRIPTION OF THE DRAWINGS

The above and other aspects, features, and advantages of certain embodiments of the present disclosure will be more apparent from the following detailed description when read in conjunction with the accompanying drawings, in which.

DETAILED DESCRIPTION

Figure 1:
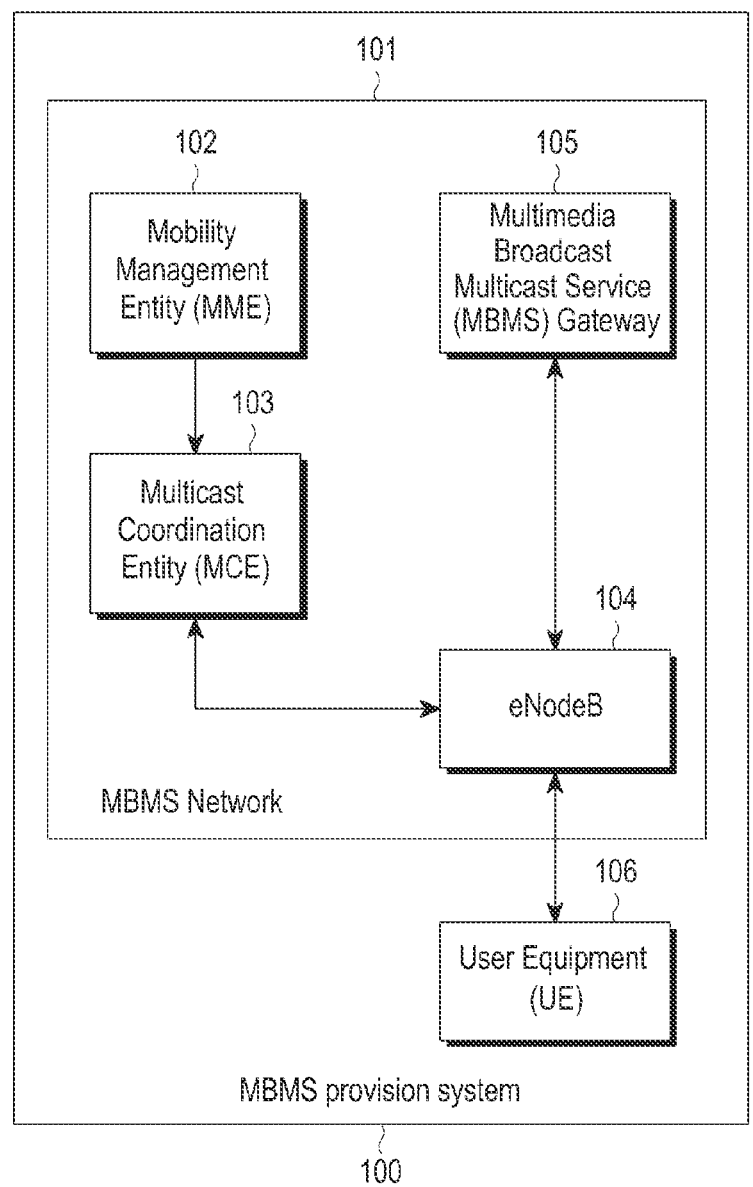
FIG. 1 is a block diagram illustrating an MBMS provisioning system, according to an embodiment of the present disclosure.

Various embodiments of the present disclosure are described in detail below with reference to the accompanying drawings. The same reference numbers are used throughout the drawings to refer to the same or like parts. Additionally, detailed descriptions of well-known functions and structures incorporated herein may be omitted to avoid obscuring the subject matter of the present disclosure.

Accordingly, examples provided herein should not be construed as limiting the scope of the embodiments herein. The term "cell" used in the following description refers to a sector being served by the eNodeB. One eNodeB can serve multiple cells.

The embodiments herein disclosed relate to a method and system for providing MBMS continuity in a telecommunication network.

Referring now to the drawings, and more particularly to FIGS. 1-7, where similar reference characters denote corresponding features consistently throughout the figures, there are shown several embodiments.

FIG. 1 is a block diagram illustrating an MBMS provisioning system 100, according to an embodiment of the present disclosure. The MBMS provisioning system 100 includes an MBMS network 101 and at least one UE 106. The MBMS network 101 includes a mobility management entity (MME) 102, a multicast coordination entity (MCE) 103, at least one eNodeB 104, and an MBMS gateway 105.

The UE 106 is configured to communicate with the eNodeB 104 to access the MBMS network 101. The MCE 103 is configured to communicate with the eNodeB 104 and the MME 102 to manage resources and contents of various MBMS services being offered by the MBMS network 101. The MME 102 is configured to act as a key control node and is responsible for managing and controlling IDLE mode operation of the UE 106. The MME 102 is further responsible for authenticating the any resource/service access attempts of the UE 106.

The MBMS gateway 105 is configured to manage and control multicast process for distributing MBMS user plane data. The MBMS gateway 105 is responsible for performing MBMS session control signaling through the MME 102. The MBMS gateway 105 is further configured to provide MBMS service continuity between the MBMS network 101 and the UE 106. The MBMS gateway 105 is also configured to provide at least one means for applying cell reselection rules for ensuring the MBMS service continuity. The MBMS gateway 105 is also configured to provide means for applying cell restrictions on non-MBMS cell(s).

Figure 2:
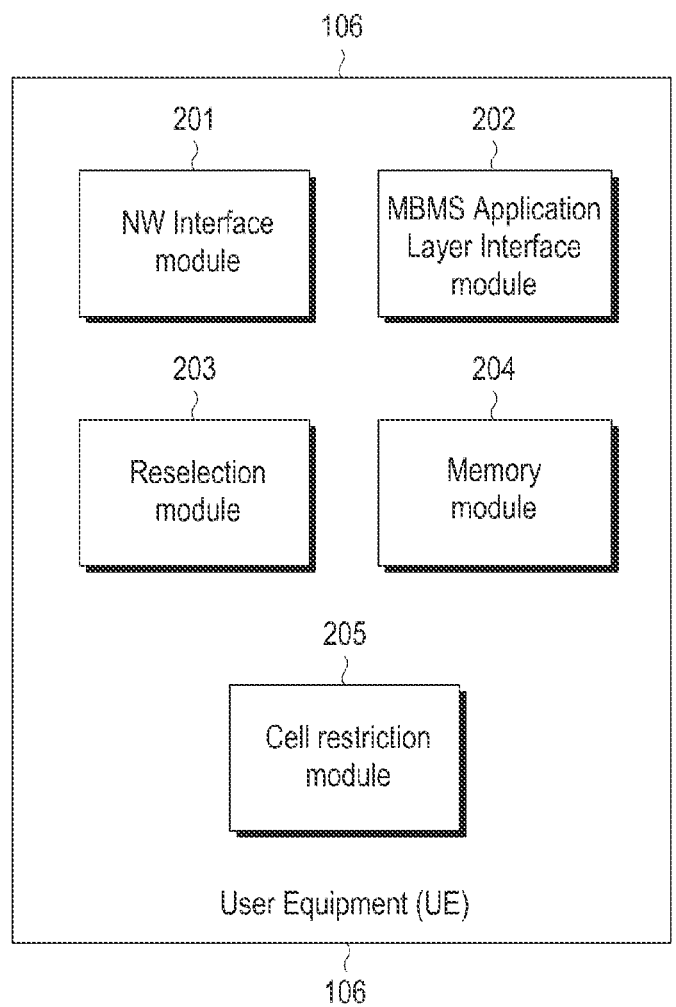
FIG. 2 is a block diagram illustrating components of an MBMS enabled UE, according to an embodiment of the present disclosure.

FIG. 2 is a block diagram illustrating components of an MBMS enabled UE, according to an embodiment of the present disclosure. The MBMS enabled UE 106 includes a network (NW) interface module 201, an MBMS application layer interface module 202, a reselection module 203, a memory module 204, and a cell restriction module 205.

The NW interface module 201 is configured to provide a means for connecting, using a suitable communication channel, the MBMS gateway 105 to the UE 106 through the eNodeB 104. The NW interface module 201 is further configured to provide suitable means for the MBMS gateway 105 to collect all inputs required for the purpose of providing MBMS data continuity. For example, the NW interface module 201 communicates with the network and receives the information regarding barring time to apply for non-MBMS cells.

The MBMS Application Layer interface module 202 is configured to communicate with third party service providers, which offer different types of MBMS services to the UE 106. The MBMS Application Layer interface module 202 is further configured to perform an authentication check of the third party service providers, which connect with the MBMS network 101. The MBMS Application Layer interface module 202 is also configured to perform pre-processing of data received from the associated third party vendors, if required.

The reselection module 203 is configured to perform cell reselection measurement, wherein the reselection module 203 determines signal strength of the cell being considered. The reselection module 203 is further configured to determine configuration of the cell to facilitate MBMS. The reselection module 203 is also configured to determine whether the measured signal strength matches a predetermined strength value, wherein the predetermined strength value is a threshold value.

The memory module 204 is configured to store any data associated with the process of ensuring MBMS service continuity. For example, the memory module 204 stores information related to a predetermined strength value pertaining to signal strength. The memory module 204 also stores information related to type of MBMS service(s) that each UE 106 has subscribed for. The memory module 204 is further configured to store data required for performing authentication check of the UE 106, as well as the service providers.

The cell restriction module 205 is configured to apply selected restriction(s) to selected cell(s). For example, the cell restriction module 205 is used to perform cell specific barring on selected cell(s). The cell restriction module 205 can bar a selected cell for a selected/preconfigured time period. The cell restriction module 205 can also bar a selected cell until an expiration of the current session.

Figure 3:
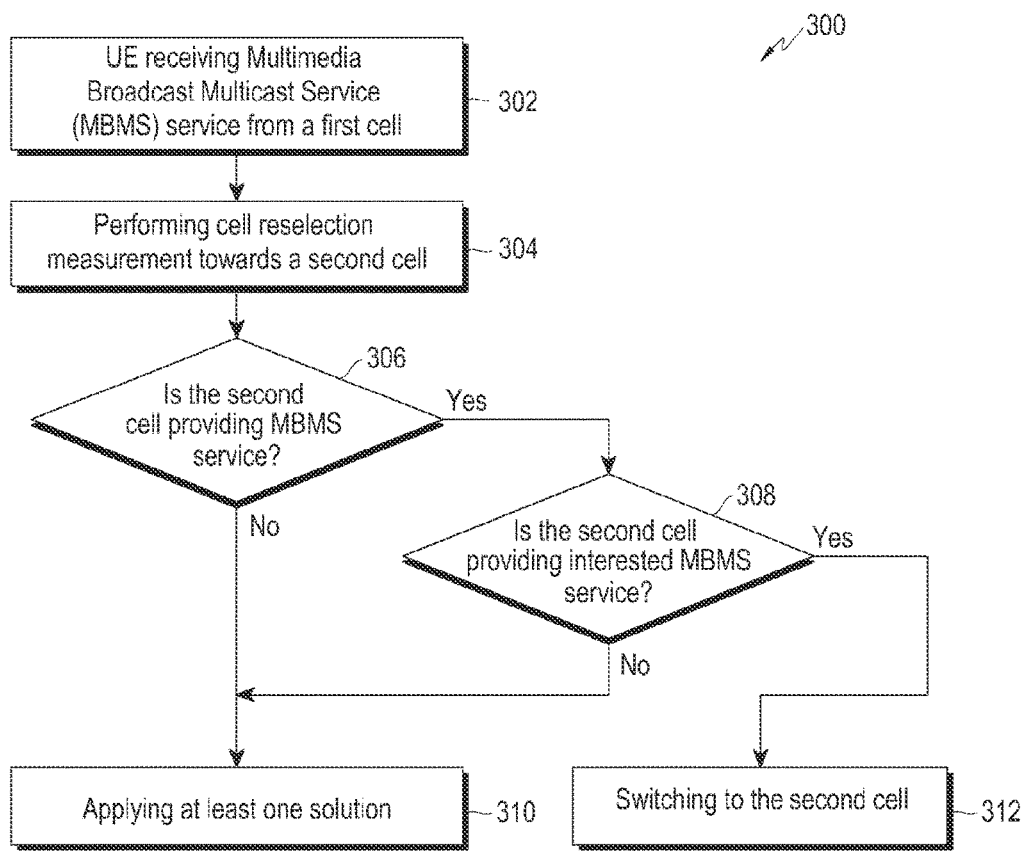
FIG. 3 is a flowchart illustrating a method of providing MBMS continuity using the MBMS provisioning system, according to an embodiment of the present disclosure.

FIG. 3 is a flowchart illustrating a method 300 of providing MBMS continuity using the MBMS provisioning system, according to an embodiment of the present disclosure. The MBMS network 101 provides, at step 302, an MBMS of interest to the UE 106, from a first cell that is configured to provide the MBMS of interest and a signal strength that at least matches a pre-determined strength value.

While receiving the MBMS from the first cell, the UE 106 performs, at step 304, cell reselection measurement towards a second cell, wherein the second cell is a neighboring cell of the first cell, while the UE 106 initiates cell reselection measurement based on signal strength of the second cell. The term "MBMS capability" used henceforth refers to capability of the second cell to provide the MBMS of interest to the UE 106.

During the cell reselection, if the second cell is found to have MBMS capability, then the reselection module 203 checks, at step 308, whether the second cell provides the MBMS of interest. If the second cell is providing the MBMS of interest and if the signal strength of the second cell is more than that of the first cell, then the UE 106 reselects, at step 312, to the second cell, and the MBMS gateway 105 provides the MBMS of interest through the second cell.

In accordance with another embodiment of present disclosure, the UE 106 can switch to the second cell if the signal strength provided by the second cell is higher than that of the first cell. If the second cell is not providing MBMS or the MBMS service of interest to the user, then the UE 106 switches back to the first cell.

In accordance with another embodiment of the present disclosure, instead of switching back to the first cell, the UE 106 can, with or without the assistance of the reselection module 203, scan any of the neighboring cells, select a cell that matches requirements in terms of signal strength and MBMS capability, and then switch to the selected cell.

If the second cell is not providing MBMS, the MBMS enabled UE 106 applies, at step 310, at least one selected solution to that cell. Alternatively, the MBMS enabled UE 106 can apply the solution(s) if the second cell is providing MBMS, however, not the MBMS of interest. For example, by applying a first solution, the MBMS enabled UE 106 reselects back to the first cell, from the second cell that does not provide MBMS/MBMS of interest. The various actions in the method 300 illustrated in FIG. 3 can be performed in the order presented, in a different order or simultaneously. Further, in some embodiments, some actions listed in FIG. 3 may be omitted.

Figure 4:
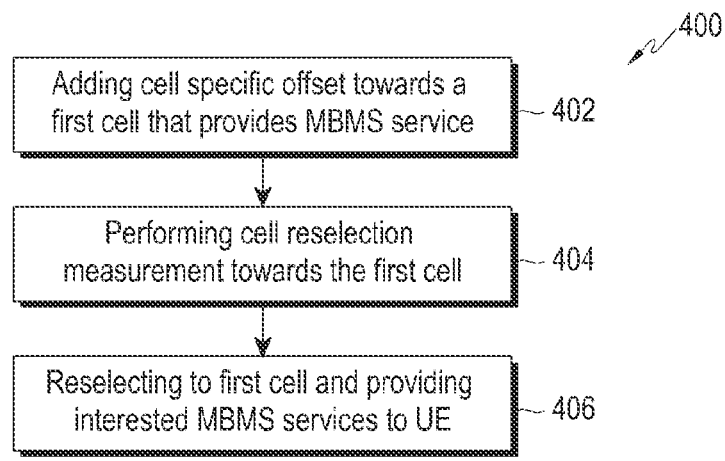
FIG. 4 is a flowchart illustrating a method of reselecting from a non-MBMS cell to an MBMS cell by means of cell specific offset, using the MBMS provisioning system, according to an embodiment of the present disclosure.

FIG. 4 is a flowchart illustrating a method 400 of reselecting from a non-MBMS cell to an MBMS cell by means of cell specific offset using the MBMS provisioning system, according to an embodiment of the present disclosure. The MBMS enabled UE 106 can use this method as a first solution upon identifying that the current cell (i.e. the second cell) the UE 106 is connected to is not providing an MBMS, or an MBMS of interest.

Upon identifying that the current cell (i.e. the second cell) that the UE 106 is connected to is not providing the MBMS, or the MBMS of interest, the reselection module 203 decides to switch back to the previous cell i.e. the first cell. To switch back to the first cell, the reselection module 203 adds, at step 402, a cell specific offset towards the first cell. In another embodiment, the offset shall be applied towards the second cell instead of the first cell. In an embodiment, the UE 106, based on data stored in the memory module 204, selects the cell specific offset. In another embodiment, the cell specific offset can be selected by the eNB 104. Further, by performing the cell reselection measurement and subsequent cell reselection, the UE 106 is switched, at step 406, to the first cell, through which the MBMS gateway 105 provides the MBMS of interest to the UE 106. The various actions in the method 400 illustrated in FIG. 4 may be performed in the order presented, in a different order or simultaneously. Further, in some embodiments, some actions listed in FIG. 4 may be omitted.

Figure 5:
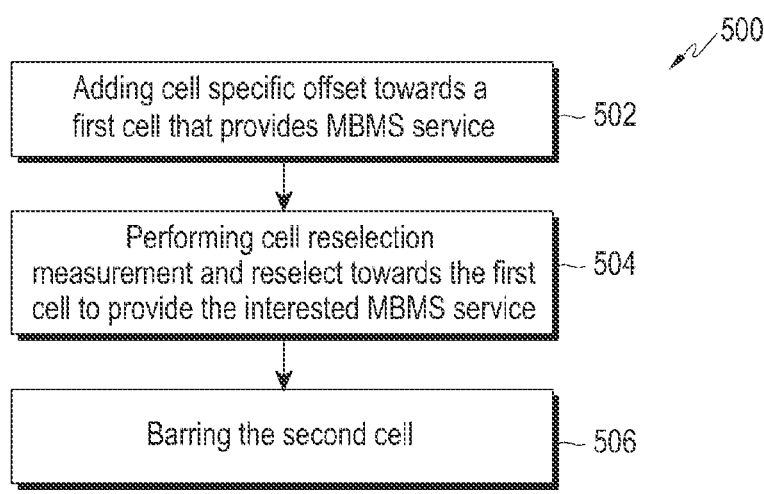
FIG. 5 is a flowchart illustrating a method of barring a non-MBMS cell after performing cell reselection, using the MBMS provisioning system, according to an embodiment of the present disclosure.

FIG. 5 is a flowchart illustrating a method 500 of barring a non-MBMS cell after performing cell reselection, using the MBMS provisioning system, according to an embodiment of the present disclosure. The MBMS enabled UE 106 can use this method as a second solution upon identifying that the current cell (i.e. the second cell) the UE 106 is connected to is not providing an MBMS, or an MBMS of interest.

The MBMS enabled UE 106, upon identifying that the second cell the UE 106 is connected to is not providing the MBMS, or the MBMS of interest, adds, at step 502, a cell specific offset towards the first cell which has a configuration that matches requirements in terms of signal strength and MBMS capability. In another embodiment, the offset shall be applied towards a second cell instead of the first cell. Further, by performing cell reselection measurement towards the first cell, the UE 106 switches to the first cell, and the MBMS gateway 105 provides the MBMS of interest to the UE 106 through the first cell. Further, to prevent further cell reselection measurement towards the second cell that does not provide MBMS/the MBMS of interest, the UE 106 applies a suitable cell barring mechanism, and bars, at step 506, the second cell. In various embodiments, the cell can be barred for a selected time period, or until the end of the current MBMS session. The various actions in the method 500 illustrated in FIG. 5 may be performed in the order presented, in a different order or simultaneously. Further, in some embodiments, some actions listed in FIG. 5 may be omitted.

Figure 6:
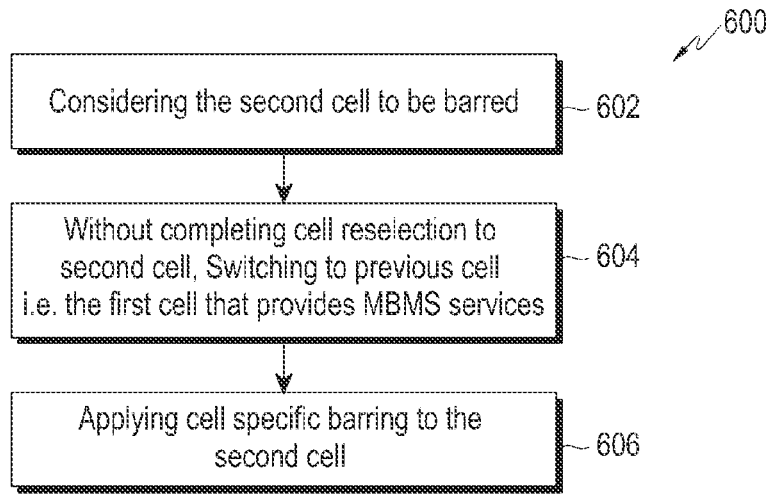
FIG. 6 is a flowchart illustrating a method of barring a non-MBMS cell directly, without performing cell reselection, using the MBMS provisioning system, according to an embodiment of the present disclosure.

FIG. 6 is a flowchart illustrating a method 600 of directly barring a non-MBMS cell or cell not supporting the MBMS of interest (i.e. a second cell); immediately after reselecting to second cell using the MBMS provisioning system, according to an embodiment of the present disclosure. The MBMS enabled UE 106 shall subsequently return to previously camped cell immediately without completing the reselection procedure to second cell. The MBMS enabled UE 106 can use this method as a third solution upon identifying that the current cell (i.e. the second cell) the UE 106 is trying to reselect to is not providing an MBMS, or an MBMS of interest.

In this method, upon identifying that the second cell does not provide the MBMS, or the MBMS of interest, the MBMS UE 106 considers, at step 602, the second cell to be barred. Further, without completing a cell reselection procedure towards the second cell, the UE 106 is immediately switched, at step 604, back to the previous cell i.e. the first cell, which had been providing the MBMS of interest service to the UE 106, before switching to the second cell.

Further, the UE 106 applies, at step 606, cell specific restriction(s) to the second cell. For example, the cell specific restriction can refer to barring the second cell using a suitable cell barring mechanism. In various embodiments, the cell can be barred for a selected time period, or until the end of the current MBMS session. The various actions in method 600 illustrated in FIG. 6 may be performed in the order presented, in a different order or simultaneously. Further, in some embodiments, some actions listed in FIG. 6 may be omitted.

Figure 7:
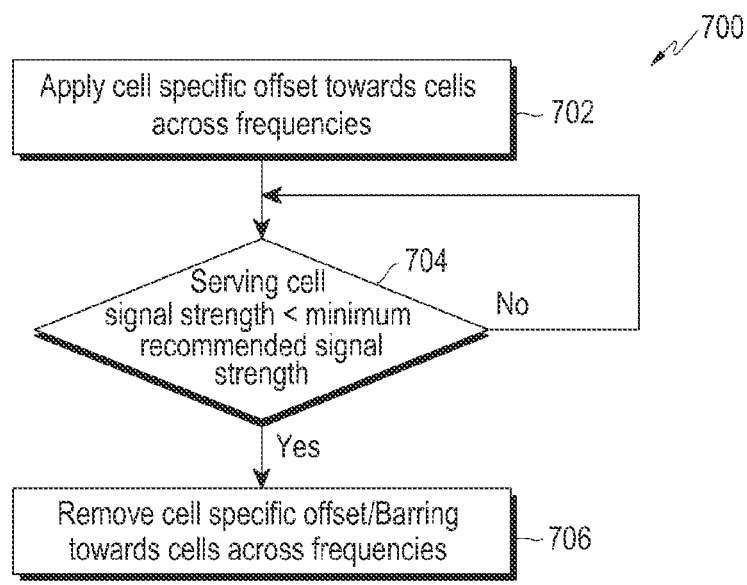
FIG. 7 is a flowchart illustrating a method of removing applied cell specific restrictions, according to an embodiment of the present disclosure.

FIG. 7 is a flowchart illustrating a method 700 of removing applied cell specific restrictions, according to an embodiment of the present disclosure. Consider that the UE 106 has applied, at step 702, cell specific restriction(s) (which can be an offset, or barring) across frequencies. The UE 106 compares, at step 704, the signal strength of the cell currently serving the UE 106 with MBMS with a minimum level of signal strength (as defined in the system information). If the signal strength of the cell currently serving the UE 106 is less than the minimum level of signal strength, the UE 106 removes, at step 706, cell specific restriction(s) (which can be an offset, or barring) across frequencies towards cells, which do not provide non-MBMS. The UE 106 removes the restrictions immediately. The various actions in method 700 illustrated in FIG. 7 may be performed in the order presented, in a different order or simultaneously. Further, in some embodiments, some actions listed in FIG. 7 may be omitted.

The embodiments disclosed herein can be implemented through at least one software program running on at least one hardware device and performing network management functions to control the elements. The elements shown in FIG. 1 can be at least one of a hardware device, or a combination of hardware device and software module.

It should be understood that the embodiments described herein are to be considered in a descriptive sense only and not for purposes of limitation. Descriptions of features or aspects within each embodiment should typically be considered as available for other similar features or aspects in other embodiments.

While one or more embodiments of the present disclosure have been described with reference to the figures, it will be understood by those of ordinary skill in the art that various changes in form and details may be made therein without departing from the spirit and scope of the present disclosure as defined by the following claims and their equivalents.

What is claimed is:

1. A method for providing IDLE mode multimedia broadcast multicast service (MBMS) continuity by a user equipment (UE) in a telecommunication network, the method comprising:
receiving, by the UE, an MBMS of interest for the UE from a first cell in the telecommunication network;

performing, by the UE, a cell re-selection measurement of at least a second cell, the second cell being a neighboring cell to the first cell, wherein the cell re-selection measurement comprises determining a configuration of the second cell to facilitate an MBMS and determining a signal strength matching a predetermined strength value;

selecting, by the UE, one of the first cell and the second cell, which is configured to facilitate the MBMS and has a signal strength value at least equal to the predetermined strength value and greater than the other cell;

executing, by the UE, a first solution, if the second cell does not facilitate the MBMS, wherein executing the first solution comprises:
 adding a cell specific offset towards at least one of the first cell and the second cell,
 performing a cell re-selection measurement towards the first cell,
 re-selecting the first cell, and
 receiving the MBMS of interest from the re-selected first cell; and
removing the cell specific offset by the UE, when a signal strength received by the UE from the first cell becomes less than the predetermined strength value.

2. The method as claimed in claim 1, wherein performing the cell re-selection measurement of the second cell further comprises determining, by the UE, a configuration of the second cell to facilitate the MBMS of interest.

3. The method as claimed in claim 1, wherein selecting the one of the first cell and the second cell comprises selecting, by the UE, one of the first cell and the second cell, which is configured to facilitate the MBMS of interest.

4. A method for providing IDLE mode multimedia broadcast multicast service (MBMS) continuity by a user equipment (UE) in a telecommunication network, the method comprising:
 receiving, by the UE, an MBMS of interest for the UE from a first cell in the telecommunication network;
 performing, by the UE, a cell re-selection measurement of at least a second cell, the second cell being a neighboring cell to the first cell, wherein the cell re-selection measurement comprises determining a configuration of the second cell to facilitate an MBMS and determining a signal strength matching a predetermined strength value;
 selecting, by the UE, one of the first cell and the second cell, which is configured to facilitate the MBMS and has a signal strength value at least equal to the predetermined strength value and greater than the other cell; and
 executing, by the UE, a second solution if the second cell does not facilitate the MBMS,
 wherein executing the second solution comprises:
  adding, by the UE, a cell specific offset towards at least one of the first cell and the second cell;
  performing by the UE, a cell re-selection measurement towards the first cell;
  re-selecting, by the UE, the first cell; and
  barring, by the LIE, the second cell,
 wherein the second cell is barred until at least one of a selected time period and an end of an MBMS session, and
 wherein when a signal strength received by the UE from the first cell becomes less than the predetermined strength value, the cell specific offset and the barring are removed by the UE.

5. The method as claimed in claim 4, wherein the selected time period is provided by the telecommunication network.

6. The method as claimed in claim 4, wherein the selected time period is provided by the UE.

7. A method for providing IDLE mode multimedia broadcast multicast service (MBMS) continuity by a user equipment (UE) in a telecommunication network, the method comprising:
 receiving, by the UE, an MBMS of interest for the UE from a first cell in the telecommunication network;
 performing by the UE, a cell re-selection measurement of at least a second cell, the second cell being a neighboring cell to the first cell, wherein the cell re-selection measurement comprises determining a configuration of the second cell to facilitate an MBMS and determining a signal strength matching a predetermined strength value;
 selecting, by the UE, one of the first cell and the second cell, which is configured to facilitate the MBMS and has a signal strength value at least equal to the predetermined strength value and greater than the other cell; and
 executing, by the UE, a third solution if the second cell does not facilitate the MBMS,
 wherein executing the third solution comprises:
  switching, by the UE, to the first cell without completing re-selection on the second cell; and
  barring the second cell by the UE,
 wherein the second cell is barred until at least one of a selected time period and an end of an MBMS session, and
 wherein when a signal strength received by the UE from the first cell becomes less than the predetermined strength value, the barring is removed by the UE.

8. The method as claimed in claim 7, wherein the selected time period is provided by the telecommunication network.

9. The method as claimed in claim 7, wherein the selected time period is provided by the UE.

10. A user equipment (UE) for providing IDLE mode multimedia broadcast multicast service (MBMS) service continuity in a telecommunication network, the system comprising:
 a network interface configured to receive an MBMS of interest for the UE from a first cell in the telecommunication network; and
 a processor configured to:
  perform a cell re-selection measurement of a second cell, the second cell being a neighboring cell to the first cell, wherein the cell re-selection measurement includes determining a configuration of the second cell to facilitate an MBMS and determining a signal strength matching a predetermined strength value,
  select one of the first cell and the second cell, which is configured to facilitate the MBMS and has a signal strength value that is greater than or equal to the predetermined strength value,
  execute a first solution if the second cell does not facilitate the MBMS, wherein the UE is configured to execute the first solution by:
   adding a cell specific offset towards at least one of the first cell and the second cell;
   performing a cell re-selection measurement towards the first cell; and
   re-selecting the first cell and providing the MBMS of interest to the UE, and remove the cell specific offset, when a signal strength received by the UE from the first cell becomes less than the predetermined strength value.

11. The UE as claimed in claim 10, wherein the processor is further configured to perform the cell re-selection measurement of the second cell by determining a configuration of the second cell to facilitate the MBMS of interest.

12. The UE as claimed in claim 10, wherein the processor is further configured to select one of the first cell and the second cell, which is configured to facilitate the MBMS of interest.

13. The UE as claimed in claim 10, wherein the processor is further configured to execute a second solution if the second cell does not facilitate the MBMS, and
   wherein the processor is further configured to execute the second solution by:
      adding a cell specific offset towards at least one of the first cell and the second cell;
      performing a cell reselection measurement towards the first cell;
   reselecting to the first cell; and
   barring the second cell.

14. The UE as claimed in claim 13, wherein the processor is further configured to remove the barring of the second cell when the signal strength received by the UE from the first cell becomes less than the predetermined strength value.

* * * * *